(12) United States Patent
Krause et al.

(10) Patent No.: US 7,544,123 B2
(45) Date of Patent: Jun. 9, 2009

(54) AIR VENT, IN PARTICULAR FOR A VEHICLE

(75) Inventors: Reinhard Krause, Marktredwitz-Brand (DE); Sabine Steinbeiss, Selb (DE)

(73) Assignee: TRW Automotive Electronics & Components GmbH & Co. KG, Enkenbach Alsenbom (DE)

( * ) Notice: Subject to any disclaimer, the term of this patent is extended or adjusted under 35 U.S.C. 154(b) by 0 days.

(21) Appl. No.: 11/222,003

(22) Filed: Sep. 8, 2005

(65) Prior Publication Data

US 2006/0052046 A1 Mar. 9, 2006

(30) Foreign Application Priority Data

Sep. 9, 2004 (DE) .................. 10 2004 043 696

(51) Int. Cl.
*F24F 13/14* (2006.01)
*F24F 13/12* (2006.01)

(52) U.S. Cl. .................. 454/315; 454/310; 454/311; 454/312

(58) Field of Classification Search ......... 454/311–312, 454/315, 316, 320, 143, 145
See application file for complete search history.

(56) References Cited

U.S. PATENT DOCUMENTS

| 3,035,504 A | 5/1962 | Cline et al. |
| 3,898,921 A | 8/1975 | Trube et al. |
| 4,735,131 A | 4/1988 | Matsuno |
| 5,766,070 A | 6/1998 | Schwarz |
| 2003/0157880 A1* | 8/2003 | Nishida et al. .............. 454/155 |

FOREIGN PATENT DOCUMENTS

| DE | 1983964 | 4/1968 |
| DE | 2153743 | 5/1973 |
| DE | 2805517 | 8/1978 |
| DE | 4433698 | 12/1995 |
| DE | 19654416 | 5/1998 |
| DE | 19850989 | 5/2000 |
| DE | 10104428 | 8/2002 |
| DE | 10118435 | 10/2002 |
| EP | 0803388 | 10/1997 |
| FR | 2585637 | 6/1987 |
| GB | 1207158 | 9/1970 |
| GB | 1594215 | 7/1981 |

* cited by examiner

*Primary Examiner*—Steve McAllister
*Assistant Examiner*—Helena Kosanovic
(74) *Attorney, Agent, or Firm*—Tarolli, Sundheim, Covell & Tummino LLP

(57) ABSTRACT

An air vent, in particular for a vehicle, includes an air outflow channel and several operating elements which regulate the outflow direction and the volume flow of an airflow and which are designed as sliding elements, a first sliding element (14) moving horizontal vanes (16), a second sliding element (18) moving vertical vanes (20), and a third sliding element (22) moving a shutoff flap (24).

23 Claims, 3 Drawing Sheets

AIR VENT, IN PARTICULAR FOR A VEHICLE

TECHNICAL FIELD

The invention relates to an air vent, in particular for a vehicle.

BACKGROUND OF THE INVENTION

Such air vents are known in a variety of designs. In general, they serve to adjust in the desired manner the volume and the direction of an air flow supplied to a vehicle interior for air conditioning purposes. Customary components are, for one thing, a shutoff flap by means of which the volume of the air flow may be adjusted, and a plurality of vanes by means of which the direction of the air flow may be determined.

Different attempts have been made to design these air vents in an optically appealing manner. There are, for example, known operating wheels, adjusting rings, and inner levers, to which the vanes and the shutoff flap are connected, or sliding buttons that are disposed on the vanes.

It is the object of the invention to create an air vent that is designed in an optically appealing manner.

BRIEF SUMMARY OF THE INVENTION

This is achieved in an air vent, in particular for a vehicle, comprising an air outflow channel and several operating elements which regulate the outflow direction and the volume flow of an airflow and which are designed as sliding elements, a first sliding element moving horizontal vanes, a second sliding element moving vertical vanes, and a third sliding element moving a shutoff flap.

The advantages achieved with the invention are in particular that the air vent is designed to be compact, easy to operate, and that no operating elements are disposed on the vanes.

Preferably, the air vent comprises a blind which is round. Thereby, a visual effect is achieved that meets the customer requirements. The blind could, of course, also formed with corners.

An intermediate rod and a fork with two ends are provided having two ends and the first sliding element preferably communicates with at least one horizontal vane via the fork, the fork being movably disposed at its one end in a guide of the sliding element, and an intermediate rod. Thus, a simple, effective coupling is ensured.

Preferably, the fork includes a guide in which the intermediate rod is movable. On account of the guide a simple assembly may be enabled.

At least one coupling rod is provided and the horizontal vanes preferably communicate with each other via the at least one coupling rod. This saves a direct coupling of the individual vanes to the sliding element, and thus ensures a compact construction.

Preferably, the horizontal vanes are able to take several positions, in one position the horizontal vanes completely covering the air outflow channel. This is only possible, because no operating element is disposed on the vane itself. Thereby, an appealing, uniform visual effect of the air vent is made possible.

Preferably, at least one coupling rod is provided and the connecting rod communicates with at least one vertical vane, and this vane communicates via the at least one coupling rod with the remaining vertical vanes. In this manner a direct coupling of all vertical vanes to the sliding element is eliminated, and a compact construction is ensured.

A housing and a rail is provided, the vertical vanes being preferably attached to the housing via the rail, the rail including latching elements which lock into place at the housing. Here, the latching connection permits a rapid and simple assembly.

Preferably, the shutoff flap is pivotally mounted on the housing and is adapted to hermetically close the air inflow channel. Thus, if desired by the vehicle occupant, the air flow into the vehicle interior may completely be shut off.

BRIEF DESCRIPTION OF THE PREFERRED EMBODIMENT

Figure 1:
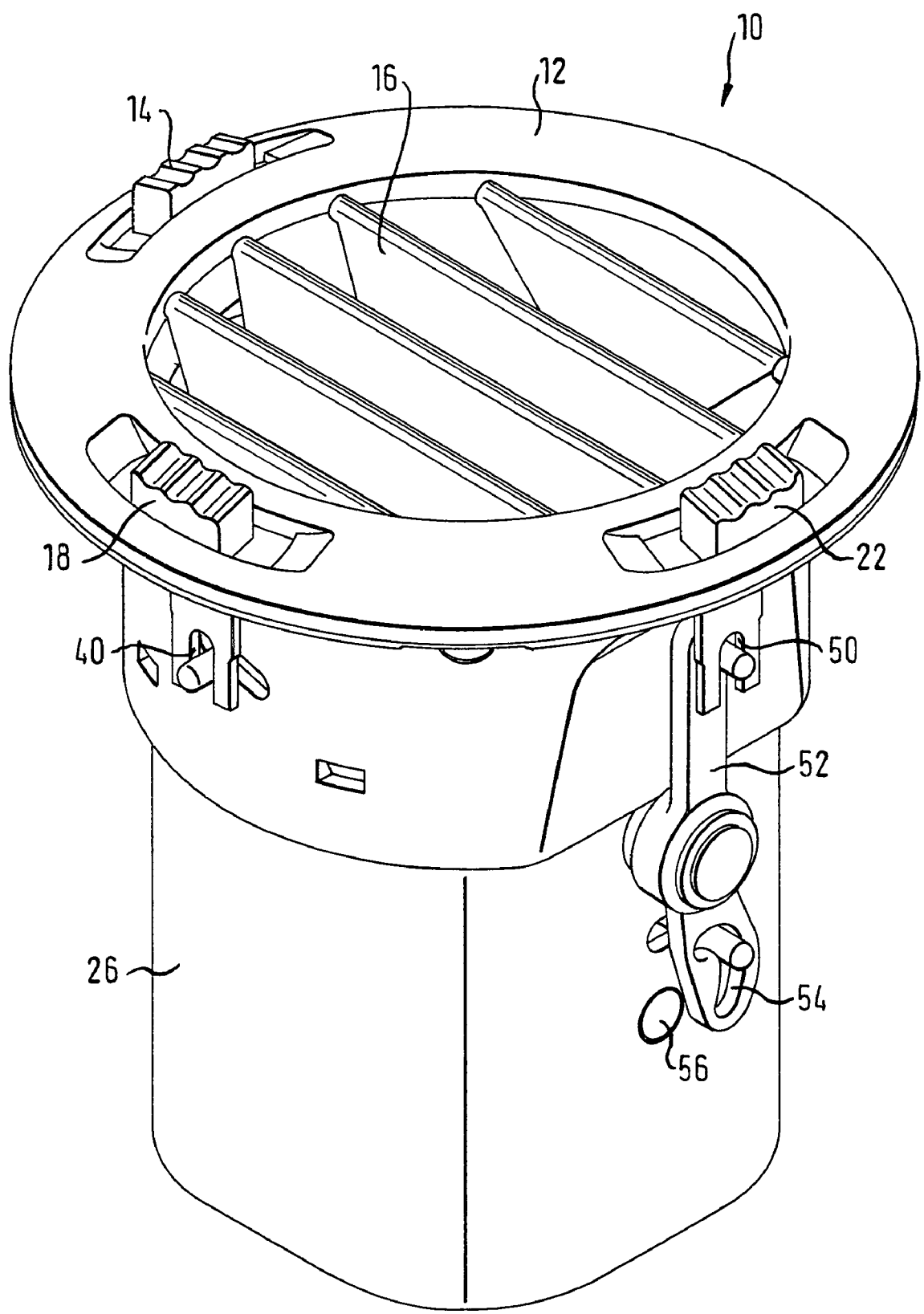
FIG. 1 shows a perspective view of an air vent in accordance with the invention.

FIG. 1 shows an air vent 10 for a vehicle ventilation system. In order to regulate the direction and the volume of the air flow, the air vent 10 comprises several horizontal vanes 16, vertical vanes 20, and a shutoff flap 24 (see also FIGS. 2 and 3).

The air vent 10 includes a housing 26. The housing 26 surrounds the air vent 10. In the lower section, the housing 26 has a rectangular base surface and widens in the upper section.

The air vent 10 comprises an air inflow channel and an air outflow channel. In this arrangement the air inflow channel extends up to the vertical vanes 20, and the air outflow channel extends from the vertical vanes 20 to a blind 12.

The blind 12 of the air vent 10 visible to the vehicle occupant is round and comprises recesses which are configured to be laterally flattened, in order to obtain a optically appealing structure. In the recesses of the blind 12, there are provided sliding elements 14, 18, and 22 which are associated with the horizontal vanes 16, the vertical vanes 20, and the shutoff flap 24 (see also FIGS. 2 and 3).

Figure 2:
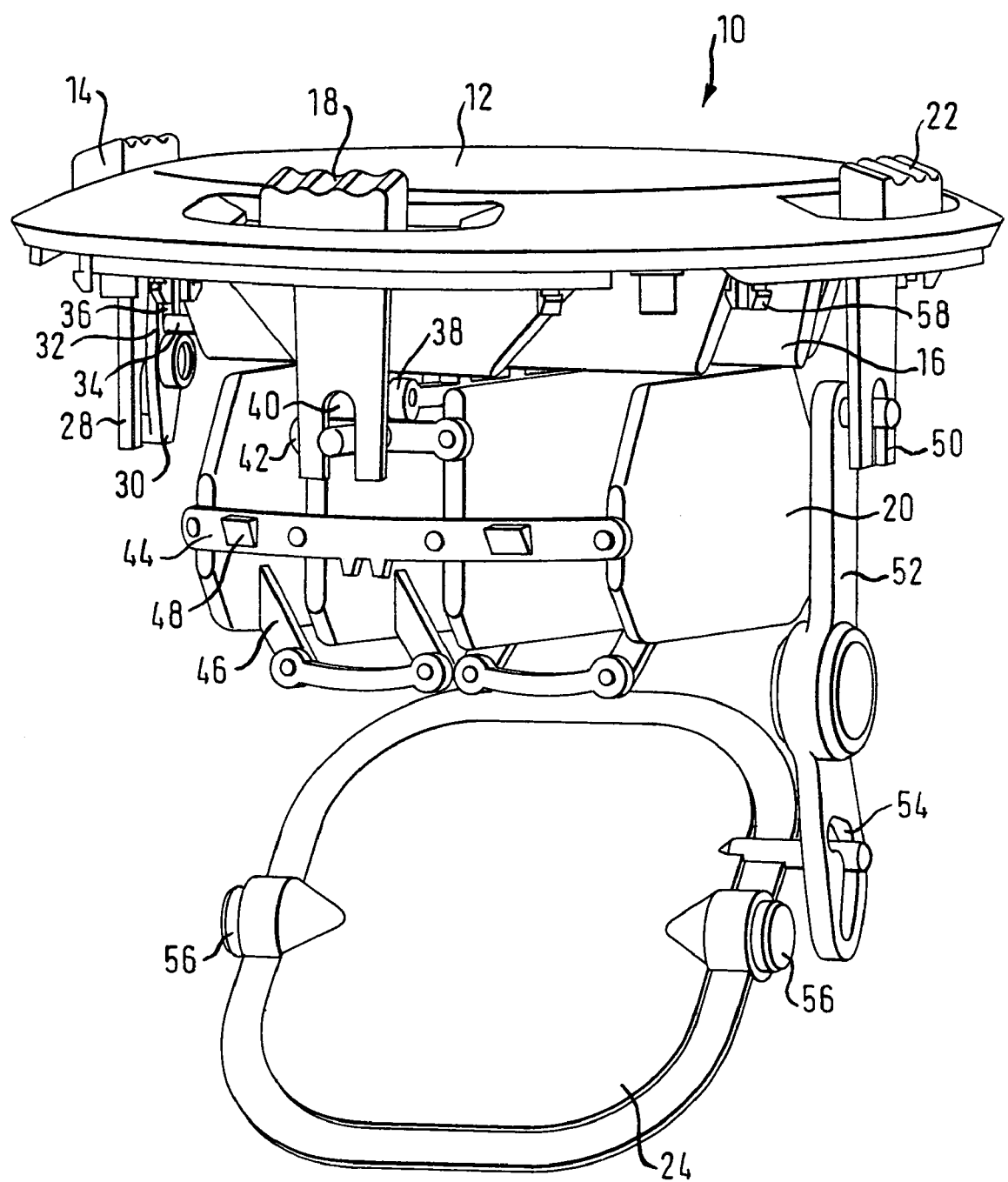
FIG. 2 shows a perspective view of the air vent of FIG. 1 without a housing.

The first sliding element 14 moves the horizontal vanes 16 (FIG. 2). It comprises a guide 28 in which the lower end of a fork 30, in particular a pin of this fork 30, is able to move. The fork 30 includes two or more webs 32 that form a guide 36. In the guide 36, there is disposed at least one intermediate rod 34 that is laterally held by the webs 32 and communicates with at least one horizontal vane 16. The other horizontal vanes 16 are connected via a coupling rod 38 to the horizontal vane 16 which is directly coupled to the sliding element 14 by means of the intermediate rod 34.

Five horizontal vanes 16 are provided arranged in parallel to each other. They are differently embodied as regards their geometrical shape. For example, the horizontal vane 16 in the middle, which is directly coupled with the intermediate rod 34 to the sliding element 14, has a length which corresponds to the diameter of the inner recess of the blind 12 and thus to the diameter of the air outflow channel, and is designed in a rectangular shape. The two outermost horizontal vanes 16 have the smallest length and are configured to be trapezoidal. Due to this fashioning of the horizontal vanes 16, the inner opening of the round blinds 12 and thus the air outflow channel may completely be covered.

The second sliding element 18 moves the vertical vanes 20 and includes a guide 40. A pin of a connecting rod 42 engages in this guide 40. The connecting rod 42 is coupled to the inner vertical vanes 20 and engages the upper section of the vertical vanes 20. The outer vertical vanes 20 are connected to the inner vertical vanes 20 via the coupling rods 46. A coupling rod 46 includes two or more bars which are connected to each other via articulation, with one bar being coupled to the inner vertical vane 20 and one being coupled to the outer vertical vane 20. The coupling rods 46 are inclined towards each other and ensure a space-saving coupling of the vertical vanes 20.

The rail 44 is arranged in the middle section of the vertical vanes 20 and connects the vertical vanes 20 to each other. It further includes latching elements 48 by means of which it may be secured to the housing 26 (FIG. 1). In doing so, the latching elements 48 engage in recesses in the housing 26.

Four vertical vanes 20 are provided arranged in parallel to each other and generally right-angled to the horizontal vanes 16. The outer vertical vanes 20 comprise chamfers, in order to find space in the housing 26 also in the closed position. The vertical vanes 20 together with the chamfers deflect the air flow.

The third sliding element 22 moves the shutoff flap 24 and comprises a guide 50 in which a pin engages that is attached to the upper end of a lever 52. The lever 52 comprises at its lower end a semicircular guide 54. A pin of the shutoff flap 24 engages in this semicircular guide 54.

In this embodiment, the shutoff flap 24 is designed to be rectangular. The rectangular shape ensures that the shutoff flap 24 may hermetically close the air inflow channel, since the housing 26 is equally designed in this region in a rectangular shape. The shutoff flap 24 includes a surrounding section sealing towards the air channel.

The shutoff flap 24 further comprises cylindrical extensions 56 that engage in the housing 26 and fix the position, but do not obstruct a rotary movement of the shutoff flap 24.

Figure 3:
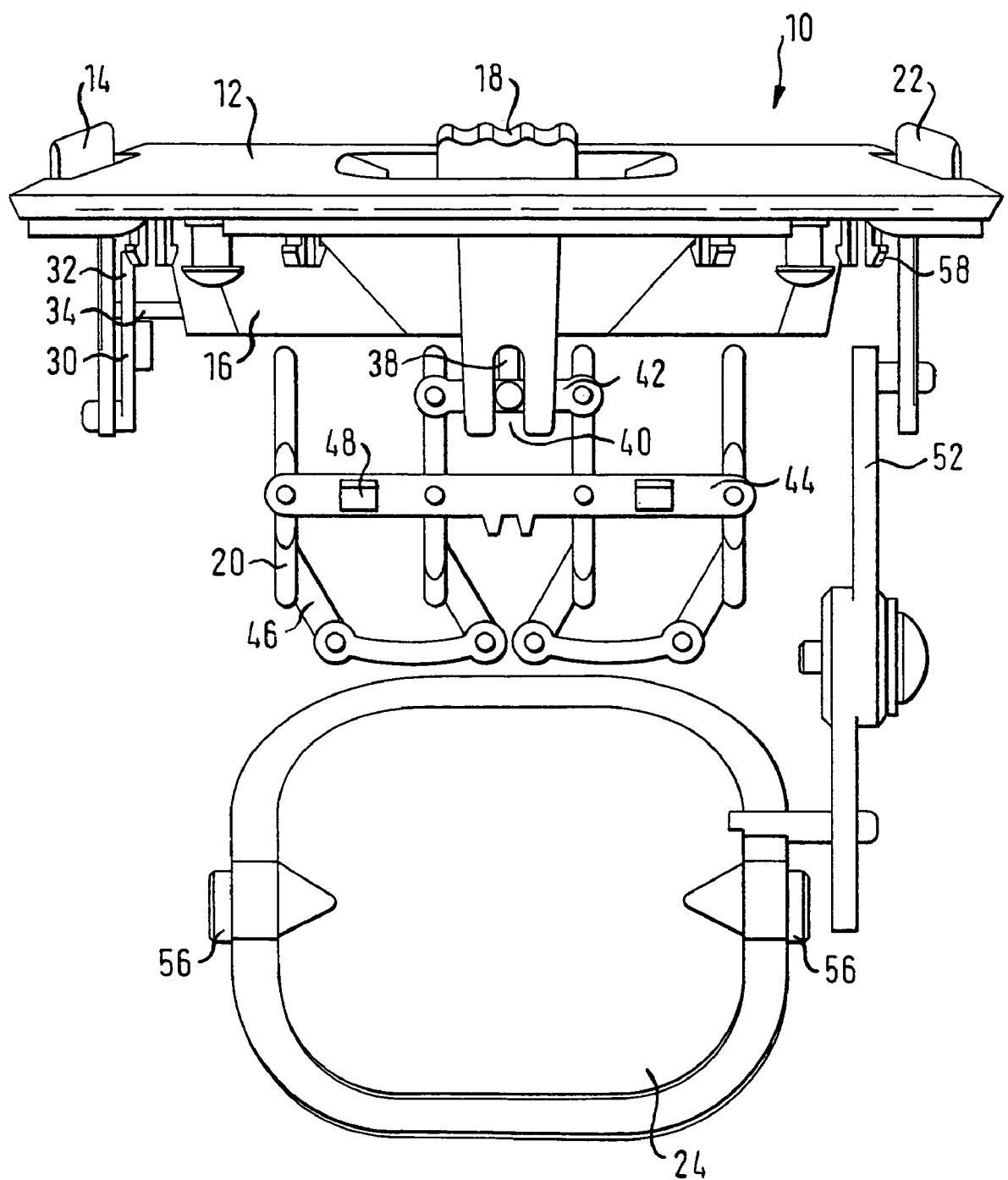
FIG. 3 shows a side view of the air vent.

FIGS. 2 and 3 show fastening elements 58 by means of which the blind 12 may be secured to the housing 26. The fastening elements 58 are circularly arranged at the blind 12 and ensure an easy and safe assembly, without impairing the manner of operation of the sliding elements 14, 18, and 22. In addition, connecting means such as threaded fasteners may secure the connection.

When the sliding elements 14, 18 and 22 are in the so-called central position, as shown in FIG. 1, the horizontal vanes 16 and the vertical vanes 20 are completely open, and the shutoff flap 24 partly closes the air inflow channel.

If the first or second sliding element 14, 18 is moved out of the central position, this results in the horizontal and vertical vanes 16, 20, respectively, deflecting the air flow either in the one direction or in the other. When moving the third sliding element 22 out of the central position, the pin in the semicircular guide 54 either moves downwards or upwards and thus hermetically closes the air inflow channel or completely opens the latter, in order to permit an unobstructed air flow.

The invention claimed is:

1. An air vent for a vehicle, said air vent including an air outflow channel and several operating elements which regulate the outflow direction and the volume flow of an airflow and which are designed as sliding elements (14, 18, 22),
   a first sliding element (14) movable to move horizontal vanes (16),
   a second sliding element (18) movable to move vertical vanes (20), and
   a third sliding element (22) movable to move a shutoff flap (24), said first sliding element (14) being movable along a plane to move said horizontal vanes (16), said second sliding element (18) being movable along said plane to move said vertical vanes (20), said third sliding element (22) being movable along said plane to move said shutoff flap (24).

2. The air vent according to claim 1, wherein said air vent (10) comprises a blind (12) which is round.

3. The air vent according to claim 1, where an intermediate rod (34) and a fork (30) with two ends are provided and said first sliding element (14) communicates with at least one horizontal vane (16) via said fork (30), being movably disposed at its one end in a guide (28) of said sliding element (14), and said intermediate rod (34).

4. The air vent according to claim 3, wherein said fork (30) includes two webs (32) laterally holding said intermediate rod (34).

5. An air vent for a vehicle, said air vent including an air outflow channel and several operating elements which regulate the outflow direction and the volume flow of an airflow and which are designed as sliding elements (14, 18, 22),
   a first sliding element (14) movable to move horizontal vanes (16),
   a second sliding element (18) movable to move vertical vanes (20),
   a third sliding element (22) movable to move a shutoff flap (24), and
   an intermediate rod (34) and a fork (30) with two ends being provided and said first sliding element (14) communicating with at least one horizontal vane (16) via said fork (30), said fork being movably disposed at one end of said fork in a guide (28) of said sliding element (14), and said intermediate rod (34), wherein said fork (30) includes a guide (36) in which said intermediate rod (34) is movable.

6. The air vent according to claim 3, wherein at least one coupling rod (38) is provided and said horizontal vanes (16) communicate with each other via said at least one coupling rod (38).

7. The air vent according to claim 3, wherein the horizontal vanes (16) are able to take several positions, in one position said horizontal vanes (16) completely covering said air outflow channel.

8. The air vent according to claim 1, including a connecting rod (42) with a pin, said second sliding element (18) including a guide (40), said pin of said connecting rod (42) engaging in said guide (40).

9. The air vent according to claim 8, wherein at least one coupling rod (46) is provided and said connecting rod (42) communicates with at least one vertical vane (20), and the latter communicates via said at least one coupling rod (46) with said remaining vertical vanes (20).

10. The air vent according to claim 8, wherein a housing (26) and a rail (44) is provided, said vertical vanes (20) being attached to said housing (26) via said rail (44), the latter including latching elements (48) locking into place at said housing (26).

11. The air vent according to claim 1, wherein a lever (52) is provided and said third sliding element (22) communicates with said shutoff flap (24) via said lever (52).

12. The air vent according to claim 11, wherein a guide (50) is provided and said lever (52) has a pin at its upper end, said pin moving in said guide (50) of said sliding element (22).

13. The air vent according to claim 11, wherein said shutoff flap (24) has a pin and said lever (52) has a lower end, said lever (52) including at said lower end a semicircular guide (54) in which said pin of said shutoff flap (24) moves.

14. The air vent according to claim 11, including a housing (26) and an air inflow channel, wherein said shutoff flap (24) is pivotally mounted on said housing (26) and is adapted to hermetically close said air inflow channel.

15. The air vent according to claim 1, including a blind (12), one of said sliding elements (14, 18, 22) is in a recess formed in said blind (12), said one of said sliding elements being operable to slide relative to said blind in said recess to move one of said shutoff flap (24), said horizontal vanes (16), and said vertical vanes (20).

16. The air vent according to claim 15 wherein said blind surrounds an outlet of said air flow channel and is visible to a vehicle occupant.

17. The air vent according to claim 16 wherein said recess is configured to be laterally flattened.

18. The air vent according to claim 1, including a blind (12), said first sliding element being operable to slide relative to said blind between first and second positions, said first sliding element has a central position between said first and second positions in which said horizontal vanes are open, said second sliding element being operable to slide relative to said blind between third and fourth positions, said second sliding element has a central position between said third and fourth positions in which said vertical vanes are open, said third sliding element being operable to slide relative to said blind between fifth and sixth positions, said third sliding element has a central position between said fifth and sixth positions in which said shutoff flap is partly closed.

19. The air vent according to claim 5 wherein said first sliding element (14) is movable along a plane to move said horizontal vanes (16), said second sliding element (18) being movable along said plane to move said vertical vanes (20), and said third sliding element (22) being movable along said plane to move said shutoff flap (24).

20. The air vent according to claim 1 wherein said plane extends transverse to the axial direction of the air outflow channel.

21. The air vent according to claim 1 wherein, said first sliding element is relocatable to move said horizontal vanes, said second sliding element being relocatable to move said vertical vanes, said third sliding element being relocatable to move said shutoff flap.

22. The air vent according to claim 1 wherein, said first sliding element is movable from a first position to a second position spaced from the first position to move said horizontal vanes, said second sliding element being movable from a third position to a fourth position spaced from the third position to move said vertical vanes, said third sliding element being movable from a fifth position to a sixth position spaced from the fifth position to move said shut off flap.

23. The air vent according to claim 5, wherein said fork (30) includes two webs (32) laterally holding said intermediate rod (34).

\* \* \* \* \*